(12) United States Patent
Strandjord et al.

(10) Patent No.: US 9,537,283 B2
(45) Date of Patent: *Jan. 3, 2017

(54) LASER WITH TRANSMISSION AND REFLECTION MODE FEEDBACK CONTROL

(71) Applicant: Honeywell International Inc., Morristown, NJ (US)

(72) Inventors: Lee K. Strandjord, Tonka Bay, MN (US); Tiequn Qiu, Glendale, AZ (US); Glen A. Sanders, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/546,862

(22) Filed: Nov. 18, 2014

(65) Prior Publication Data

US 2015/0070707 A1 Mar. 12, 2015

Related U.S. Application Data

(62) Division of application No. 13/571,887, filed on Aug. 10, 2012, now Pat. No. 8,923,352.

(51) Int. Cl.
*H01S 3/13* (2006.01)
*H01S 3/10* (2006.01)
(Continued)

(52) U.S. Cl.
CPC ........... *H01S 3/1305* (2013.01); *G01C 19/727* (2013.01); *H01S 3/10092* (2013.01);
(Continued)

(58) Field of Classification Search
CPC ...... H01S 2301/14; H01S 5/141; H01S 3/105; H01S 5/06236; H01S 3/10092; H01S 3/1303; H01S 3/1304; H01S 3/1305; H01S 2301/02; H01S 3/1307; H01S 3/2383; H01S 3/005; H01S 3/0085; G01C 19/727
(Continued)

(56) References Cited

U.S. PATENT DOCUMENTS 4,123,162 A 10/1978 Sanders
4,135,822 A 1/1979 Ezekiel
(Continued)

FOREIGN PATENT DOCUMENTS

EP 1391693 2/2004
EP 1795865 6/2007
(Continued)

OTHER PUBLICATIONS

U.S. Patent and Trademark Office, "Notice of Allowance", "from U.S. Appl. No. 13/571,887", Sep. 4, 2014, pp. 1-9, Published in: US.
(Continued)

*Primary Examiner* — Jessica Manno
*Assistant Examiner* — Delma R Forde
(74) *Attorney, Agent, or Firm* — Fogg & Powers LLC

(57) ABSTRACT

One embodiment is directed towards a stabilized laser including a laser to produce light at a frequency and a resonator coupled to the laser such that the light from the laser circulates therethrough. The laser also includes Pound-Drever-Hall (PDH) feedback electronics configured to adjust the frequency of the light from the laser to reduce phase noise in response to light sensed at the reflection port of the resonator and transmission port feedback electronics configured to adjust the frequency of the light from the laser toward resonance of the resonator at the transmission port in response to the light sensed at the transmission port of the resonator, wherein the transmission port feedback electronics adjust the frequency at a rate at least ten times slower than the PDH feedback electronics.

15 Claims, 13 Drawing Sheets

(51) Int. Cl.
   *G01C 19/72* (2006.01)
   *H01S 3/23* (2006.01)
   *H01S 3/00* (2006.01)

(52) U.S. Cl.
   CPC .......... *H01S 3/1303* (2013.01); *H01S 3/1304* (2013.01); *H01S 3/005* (2013.01); *H01S 3/0085* (2013.01); *H01S 3/1307* (2013.01); *H01S 3/2383* (2013.01); *H01S 2301/02* (2013.01)

(58) Field of Classification Search
   USPC ......... 372/26, 28, 32, 75, 92, 29.01, 29.011, 96, 372/99; 356/213–236, 460, 461, 464
   See application file for complete search history.

(56) References Cited

U.S. PATENT DOCUMENTS

| | | |
|---|---|---|
| 4,289,404 A | 9/1981 | Kiehn |
| 4,352,562 A | 10/1982 | Minden |
| 4,429,997 A | 2/1984 | Matthews |
| 4,639,138 A | 1/1987 | Martin |
| 4,662,751 A | 5/1987 | Goss |
| 4,702,600 A | 10/1987 | Handrich et al. |
| 4,807,999 A | 2/1989 | Soo Hoo |
| 4,815,851 A | 3/1989 | Soohoo |
| 4,863,272 A | 9/1989 | Coccoli |
| 5,090,810 A | 2/1992 | Malvern |
| 5,100,236 A | 3/1992 | Hoo et al. |
| 5,112,128 A | 5/1992 | Soo Hoo et al. |
| 5,116,132 A | 5/1992 | Mitchell |
| 5,141,315 A | 8/1992 | Malvern |
| 5,237,387 A | 8/1993 | Sanders |
| 5,333,047 A | 7/1994 | Toyama |
| 5,347,361 A | 9/1994 | Kay |
| 5,398,111 A | 3/1995 | Cardarelli |
| 5,420,684 A | 5/1995 | Carroll |
| 5,465,149 A | 11/1995 | Strandjord et al. |
| 5,923,424 A | 7/1999 | Sanders et al. |
| 5,926,275 A | 7/1999 | Sanders et al. |
| 6,175,410 B1 | 1/2001 | Szafraniec et al. |
| 6,204,921 B1 | 3/2001 | Strandjord et al. |
| 6,580,532 B1 | 6/2003 | Yao et al. |
| 6,690,687 B2 | 2/2004 | Ksendzov et al. |
| 6,765,678 B2 | 7/2004 | Strandjord et al. |
| 6,778,279 B2 | 8/2004 | Lange et al. |
| 6,865,317 B2 | 3/2005 | Vahala et al. |
| 6,868,102 B2 | 3/2005 | Brindel |
| 6,885,794 B2 | 4/2005 | Scheuer et al. |
| 7,034,946 B2 | 4/2006 | Chen et al. |
| 7,065,276 B2 | 6/2006 | Scheuer et al. |
| 7,149,381 B2 | 12/2006 | Margalit et al. |
| 7,327,460 B2 | 2/2008 | Sanders et al. |
| 7,362,443 B2 | 4/2008 | Sanders et al. |
| 7,372,574 B2 | 5/2008 | Sanders et al. |
| 7,463,360 B2 | 12/2008 | Hughes et al. |
| 7,515,272 B2 | 4/2009 | Strandjord et al. |
| 7,522,284 B2 | 4/2009 | Sanders et al. |
| 7,535,576 B2 | 5/2009 | Keyser et al. |
| 7,583,384 B2 | 9/2009 | Keith et al. |
| 7,586,619 B2 | 9/2009 | Strandjord et al. |
| 7,801,189 B2 | 9/2010 | Maleki et al. |
| 7,855,789 B2 | 12/2010 | Strandjord et al. |
| 7,933,020 B1 | 4/2011 | Strandjord et al. |
| 8,009,296 B2 | 8/2011 | Sanders et al. |
| 2004/0061863 A1 | 4/2004 | Digonnet |
| 2006/0159135 A1 | 7/2006 | Cliche et al. |
| 2007/0014392 A1 | 1/2007 | Madey et al. |
| 2008/0137091 A1 | 6/2008 | Sanders et al. |
| 2012/0057167 A1 | 3/2012 | Strandjord et al. |
| 2012/0183004 A1 | 7/2012 | Kupershmidt |
| 2012/0300198 A1 | 11/2012 | Wu et al. |
| 2014/0240712 A1* | 8/2014 | Strandjord et al. ........... 356/461 |
| 2014/0369699 A1* | 12/2014 | Strandjord et al. ........... 398/187 |

FOREIGN PATENT DOCUMENTS

| | | |
|---|---|---|
| JP | 2001324334 | 11/2001 |
| JP | 2002054930 | 2/2002 |
| WO | 0040926 | 7/2000 |
| WO | 0077955 | 12/2000 |

OTHER PUBLICATIONS

U.S. Patent and Trademark Office, "Office Action", "from U.S. Appl. No. 13/571,887", May 22, 2014, pp. 1/30, Published in: US.

U.S. Patent and Trademark Office, "Restriction Requirement", "from U.S. Appl. No. 13/571,887", Mar. 4, 2014, pp. 1-10, Published in: US.

Sanders, "U.S. Appl. No. 61/285,990 Light-Phase-Noise Error Reducer", filed Dec. 13, 2009, Published in: US.

Chow et al., "Interrogation of a fiber Fabry-Perot sensor by current modulation of a diode laser", Feb. 2, 2008, pp. 1-3.

Hald et al., "Efficient Suppression of Diode-Laser Phase Noise by Optical Filtering", "2005 Optical Society of America", Apr. 11, 2005, vol. 22, No. 11.

Merlo et al., "Fiber Gyroscope Principles", "Handbook of Optical Fibre Sensing Technology", 2002, Publisher: John Wiley & Sons.

Rabus et al., "Optical Filter and Laser Applications Using Micro Ring Resonators", "http://www.techonline.com/showArticle.jhtml?articleID=192200552", Jul. 25, 2001, pp. 1-4.

Xia et al., "Ultra-Compact High Order Ring Resonator Filters Using Submicron Silicon Photonic Wires for On-Chip Optical Interconnects", "2007 Optical Society of America", Sep. 5, 2007, pp. 11934-11941, vol. 15, No. 19.

Zhang et al., "Electronic feedback control of the intensity noise of a single-frequency intracavity-doubled laser", "J. Opt. Soc. Am. B", Aug. 2002, pp. 1910-1916, vol. 19, No. 8.

* cited by examiner

LASER WITH TRANSMISSION AND REFLECTION MODE FEEDBACK CONTROL

CROSS-REFERENCE TO RELATED APPLICATIONS

This application is a divisional application of U.S. application Ser. No. 13/571,887 filed on Aug. 10, 2012 and titled "LASER WITH TRANSMISSION AND REFLECTION MODE FEEDBACK CONTROL", the disclosure of which is incorporated herein by reference.

BACKGROUND

The absolute frequency of a laser can be stabilized by locking the laser onto the transmission port of a resonator such as an optical ring or Fabry Perot (linear) resonator that has a stable resonance frequency. Using the transmission port (also referred to herein as "transmission mode") of the resonator can have much lower resonance lineshape asymmetry than the resonator reflection port. Lineshape asymmetries in the reflection port can result from mode mismatches between the light that travels through the resonator and light that is rejected by the resonator. The mismatches can be in either polarization modes or spatial modes. These types of lineshape asymmetries do not exist in the transmission port since only light that travels through the resonator is present at the transmission port.

The tradeoff of locking the laser onto the transmission port is that propagation delays through the resonator impose a limit on the bandwidth (i.e. speed) of the laser locking loop. In many applications there is a desire not only to reduce absolute laser frequency fluctuations at low frequencies but also at higher frequencies. The reduction of laser frequency fluctuations at a particular frequency depends on the gain in the laser locking loop at that frequency. In many applications, to reduce absolute laser frequency fluctuations at higher frequency requires a laser locking loop bandwidth that cannot be achieved when using the transmission port of the resonator.

To achieve a higher bandwidth laser locking loop, the Pound-Drever-Hall (PDH) technique can be used. For the PDH technique (also referred to herein as "reflection mode") the laser is locked to the reflection port of the resonator by using a phase modulation at a very high frequency. By using the PDH technique, fast changes in the laser frequency can be detected at the reflection port before any changes occur with the light traveling through the resonator. The reason for this is that fast changes in laser frequency or phase cause nearly immediate changes in the light reflected by the resonator, which interferes with the light coming out of the resonator. The interference produces nearly instantaneous changes in light intensity at the reflection port. This light at the reflection port can therefore be used to quickly identify changes in laser frequency or phase. The long propagation delay through the resonator no longer becomes a limit to laser locking loop bandwidth.

SUMMARY

One embodiment is directed towards a stabilized laser including a laser to produce light at a frequency and a resonator coupled to the laser such that the light from the laser circulates therethrough. The laser also includes Pound-Drever-Hall (PDH) feedback electronics configured to adjust the frequency of the light from the laser to reduce phase noise in response to light sensed at the reflection port of the resonator and transmission port feedback electronics configured to adjust the frequency of the light from the laser toward resonance of the resonator at the transmission port in response to the light sensed at the transmission port of the resonator, wherein the transmission port feedback electronics adjust the frequency at a rate at least ten times slower than the PDH feedback electronics.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
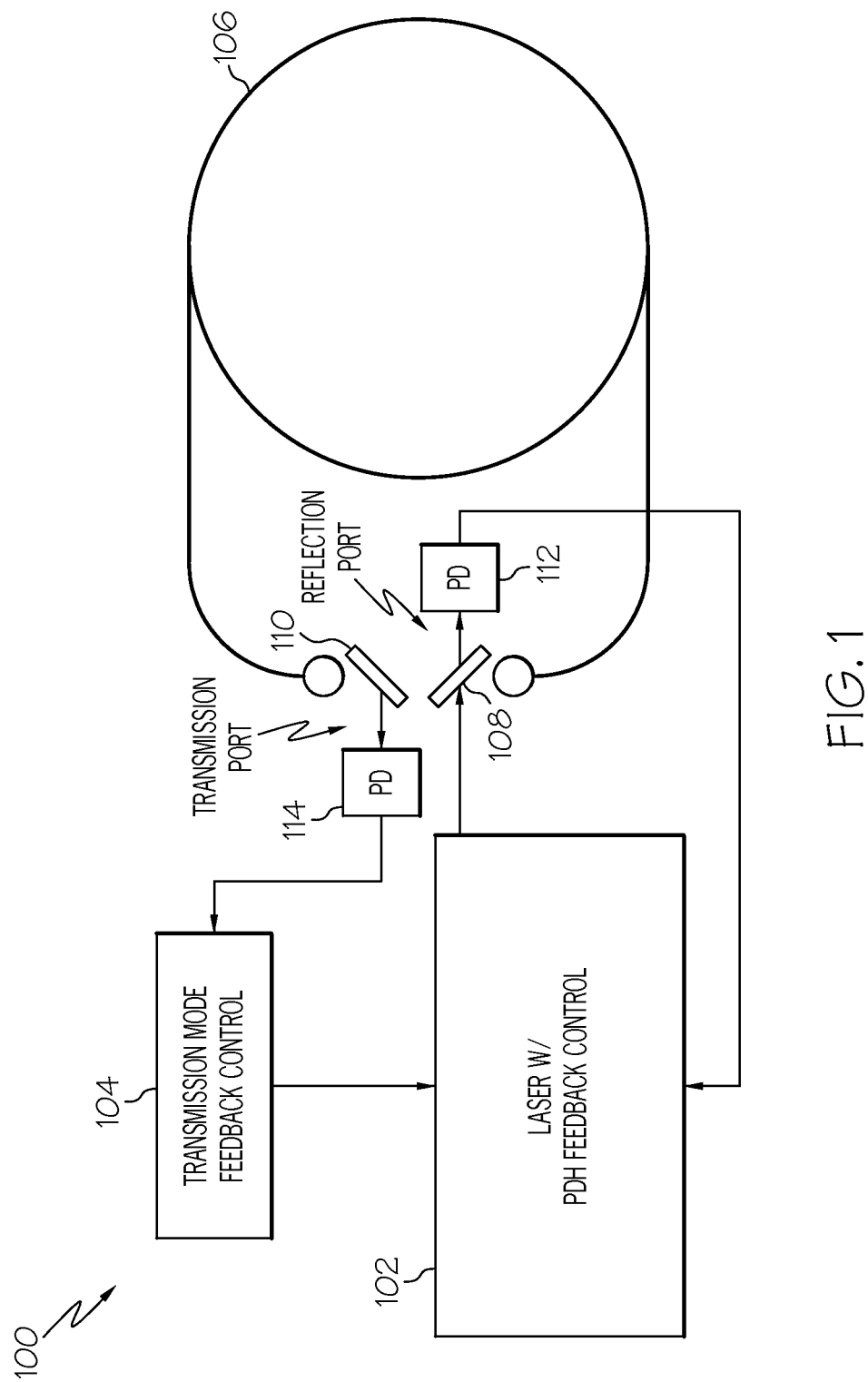
FIG. 1 is a block diagram of an example of a system including a laser with transmission and reflection mode feedback control.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the terms "light source" and "laser" are interchangeable. Similarly, as used herein, the terms "laser beam" and "light" are interchangeable.

The tradeoff to the PDH technique discussed above is that the lock laser frequency can slowly drift due to drift in resonator lineshape asymmetry. The lineshape asymmetry caused by mode mismatches can change with temperature or other environmental changes. For some applications, such as rotation sensing with a resonator fiber optic gyroscope (RFOG), the stability of the laser absolute frequency is not nearly as important as the stability of the relative frequency between the laser and the resonance frequency of the rotation sensing resonator. For RFOG applications, there is a desire to have a relative frequency between the laser and the sensing resonator that is stable to low frequencies, as low as 0.001 Hz or less.

FIG. 1 is a block diagram of an example of a system 100 including a laser 102 with transmission and reflection mode feedback control. The laser 102 is coupled to a resonator 106 such that light from the laser 102 circulates through the resonator 106. The resonator 106 includes first and second couplers 108, 110 to couple light into and out of the resonator 106 and to circulate light within the resonator 106. A coupler 108, 110 can comprise a mirror, fiber optic coupler, waveguide, or other suitable component. With two couplers 108, 110, the resonator 106 includes four input/output ports, two for each coupler 108, 110. In this example, the light from the laser 102 is sent into a first port of the first coupler 108. The first coupler 108, therefore, couples the light from the laser 102 into the resonator 106 in a first direction (e.g., counter-clockwise). Light coupled into the resonator 106 has a "transmission port" and a "reflection port" based on the port in which the light was coupled into the resonator 106. For example, the reflection port for the light from the laser 102 is the second port of the first coupler 108, and the transmission port for the light from the laser 102 is a first port of the second coupler 110.

The laser 102 is frequency stabilized using the resonator 106 with feedback control based on light from the reflection port (also referred to herein as "reflection mode feedback control") and light from the transmission port (also referred to herein as "transmission mode feedback control"). Using both transmission and reflection mode feedback control can stabilize the laser 102 at both high and low frequencies. The reflection mode feedback control described herein reduces phase noise in the laser 102 using the Pound-Drever-Hall (PDH) technique and is also referred to herein as PDH feedback control. The laser 102 with PDH feedback control receives a signal from a first photo-detector 112 that senses light from the reflection port. The transmission mode feedback control can be implemented by transmission mode feedback control electronics (FCEs) 104 and can correct drift in the frequency of the laser over time by locking the laser 102 to resonance center (also referred to herein as simply "resonance") of the resonator 106 at the transmission port. The transmission mode FCEs 104 receive a signal from a second photo-detector 114 that senses light from the transmission port. Accordingly, PDH feedback control can reduce phase noise in the laser 102, and transmission mode feedback control can correct for drift (e.g., bias) errors of the PDH feedback control. For some applications, the absolute laser phase noise and frequency drift is reduced if the resonator 106 has a resonance frequency that is more stable than the free running laser frequency. For RFOG applications, the laser phase noise and frequency drift relative to the resonator 106 are reduced, thus reducing angle random walk (ARW) and bias instability of the gyroscope. In an example, the transmission mode feedback control is configured to adjust the frequency of the laser at a rate at least ten times slower than the rate at which the PDH feedback control adjusts the frequency.

Figure 2:
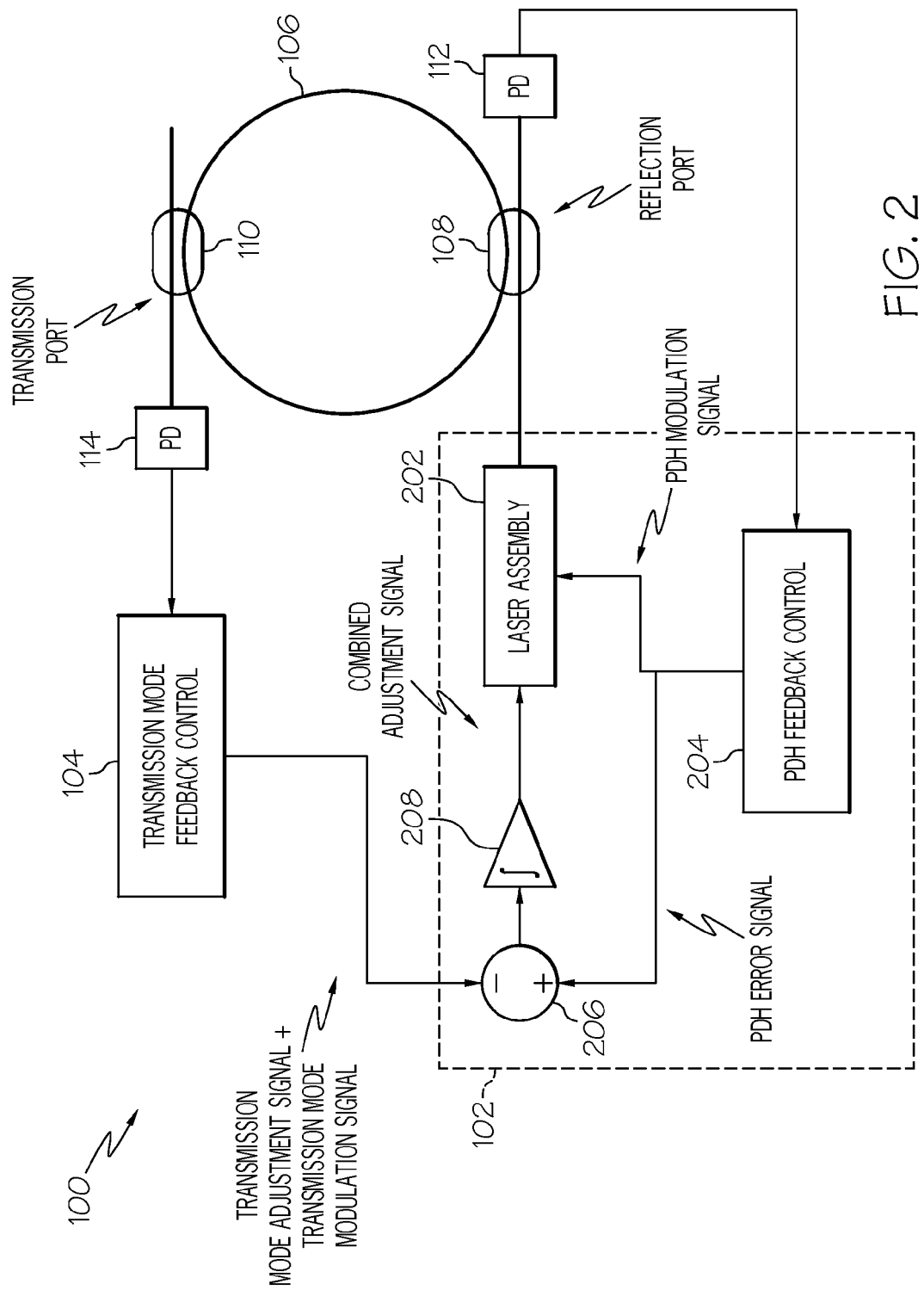
FIG. 2 is a block diagram of an example of the laser with Pound-Drever-Hall (PDH) feedback control and transmission mode feedback control of FIG. 1.

FIG. 2 is a block diagram of an example of the laser 102 with PDH feedback control and transmission mode feedback control of the system 100. In this example, a laser 102 with PDH feedback control includes a laser assembly 202 coupled to the first coupler 108 of the resonator 106. The laser assembly 202 is configured to generate light for circulation within the resonator 106. The laser 102 with PDH feedback control also includes PDH feedback control electronics (FCEs) 204 for locking the frequency of the light from the laser assembly 202 to resonance at the reflection port of the resonator 106. The PDH FCEs 204 are coupled to the laser assembly 202 and are configured to frequency modulate the light from the laser assembly 202 with a PDH modulation signal. In an example, the PDH modulation signal is a sine wave signal having a frequency within the range of 1-100 MHz. The PDH FCEs 204 are also coupled to the resonator 106 and are configured to sense light from the reflection port of the resonator 106 and to demodulate the light based on the PDH modulation signal. Based on this demodulation, the PDH FCEs 204 generate a PDH error signal for adjusting the frequency of the light from the laser assembly 202 toward resonance of the resonator 106 at the reflection port. Since the light from the laser assembly 202 is frequency modulated, the PDH error signal is configured to adjust the value of a time-averaged frequency of the light.

The transmission mode FCEs 104 lock the light from the laser assembly 202 to resonance at the transmission port of the resonator 106. To detect resonance center at the transmission port, the transmission mode FCEs 104 frequency modulate the light from the laser assembly 202 with a transmission mode modulation signal. In an example, the transmission mode modulation signal is a sine wave signal within the range of 1-100 KHz. The transmission mode modulation signal generates a resonance tracking error signal at the transmission port of the resonator 106 at the frequency of the transmission mode modulation signal. Accordingly, the transmission mode FCEs 104 are configured to sense light from the transmission port of the resonator 106 and to demodulate the light based on the transmission mode modulation signal. Based on this demodulation, the transmission mode FCEs 104 generate a transmission mode adjustment signal for adjusting the frequency of the light from the laser assembly 202 toward resonance of the resonator 106 at the transmission port. In an example, the transmission mode modulation signal has a frequency at least ten times lower than the frequency of the PDH modulation signal.

The transmission mode adjustment signal and the transmission mode modulation signal are configured to adjust the PDH error signal in order to modulate and control the frequency of the light from the laser assembly 202. In particular, the transmission mode modulation signal modulates the PDH error signal and the transmission mode adjustment signal applies a time-average shift to the PDE error signal. In this example, the transmission mode adjustment signal, transmission mode modulation signal, are combined with the PDH error signal such that the transmission mode adjustment signal is differenced in a differencing amplifier (also referred to herein as a "subtractor") 206 from the PDH error signal. The resulting signal is then integrated in an integrator (e.g., a servo amplifier) 208 to form a combined adjustment signal to adjust the laser assembly 202. The transmission mode adjustment signal, which is free of many resonator lineshape asymmetry errors, is used to correct drift errors in the PDH error signal by providing an error correction signal to the input of the PDH loop based on resonance errors at the transmission port. The transmission mode adjustment signal can cancel out errors in the PHD control loop induced by lineshape asymmetry in the reflection port or other errors associated with the PDH loop.

Figure 3:
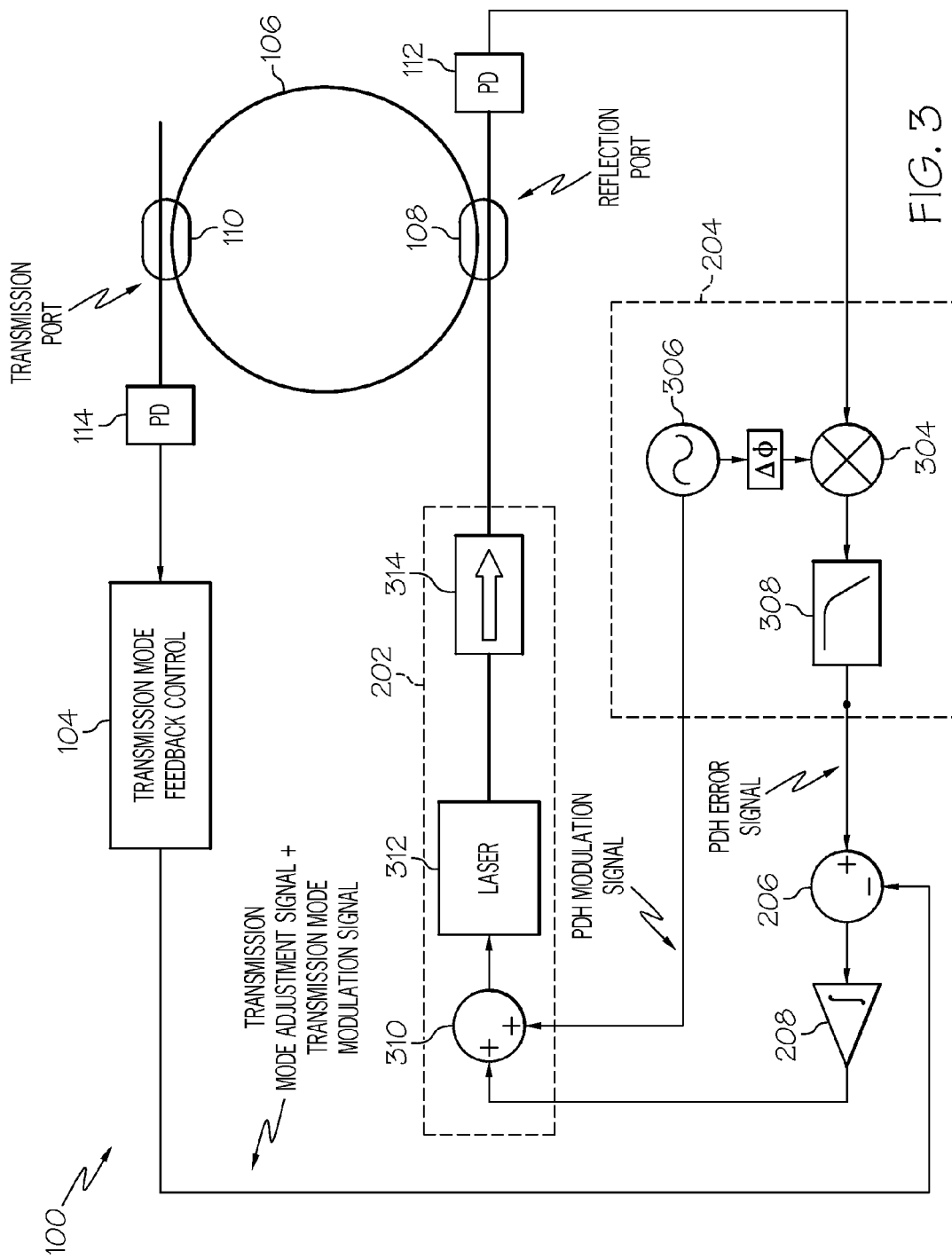
FIG. 3 is a block diagram of an example of the laser assembly and PDH feedback control of FIG. 2.

FIG. 3 is a block diagram of an example of the laser assembly 202 and PDH FCEs 204 of system 100. The PDH FCEs 204 include a mixer 304 to demodulate the electrical signal from the photo-detector 112 by mixing the electrical signal with a phase shifted version of the PDH modulation signal from the signal generator 306. The resulting signal from the mixer 304 is filtered by a low pass filter 308 to create the PDH error signal which is sent to the subtractor 206. To modulate the light from the laser assembly 202, the PDH FCEs 204 modulate the combined adjustment signal by sending the PDH modulation signal to another summer 310 which combines the PDH modulation signal with the combined adjustment signal generated from the integrator 208. The resulting signal is sent to a laser 312 to control the frequency thereof. In an example, the laser 312 is a semiconductor laser to enable high bandwidth frequency tuning and control. The laser assembly 202 can also include an isolator 314 to isolate back reflected light from entering the laser.

Figure 4:
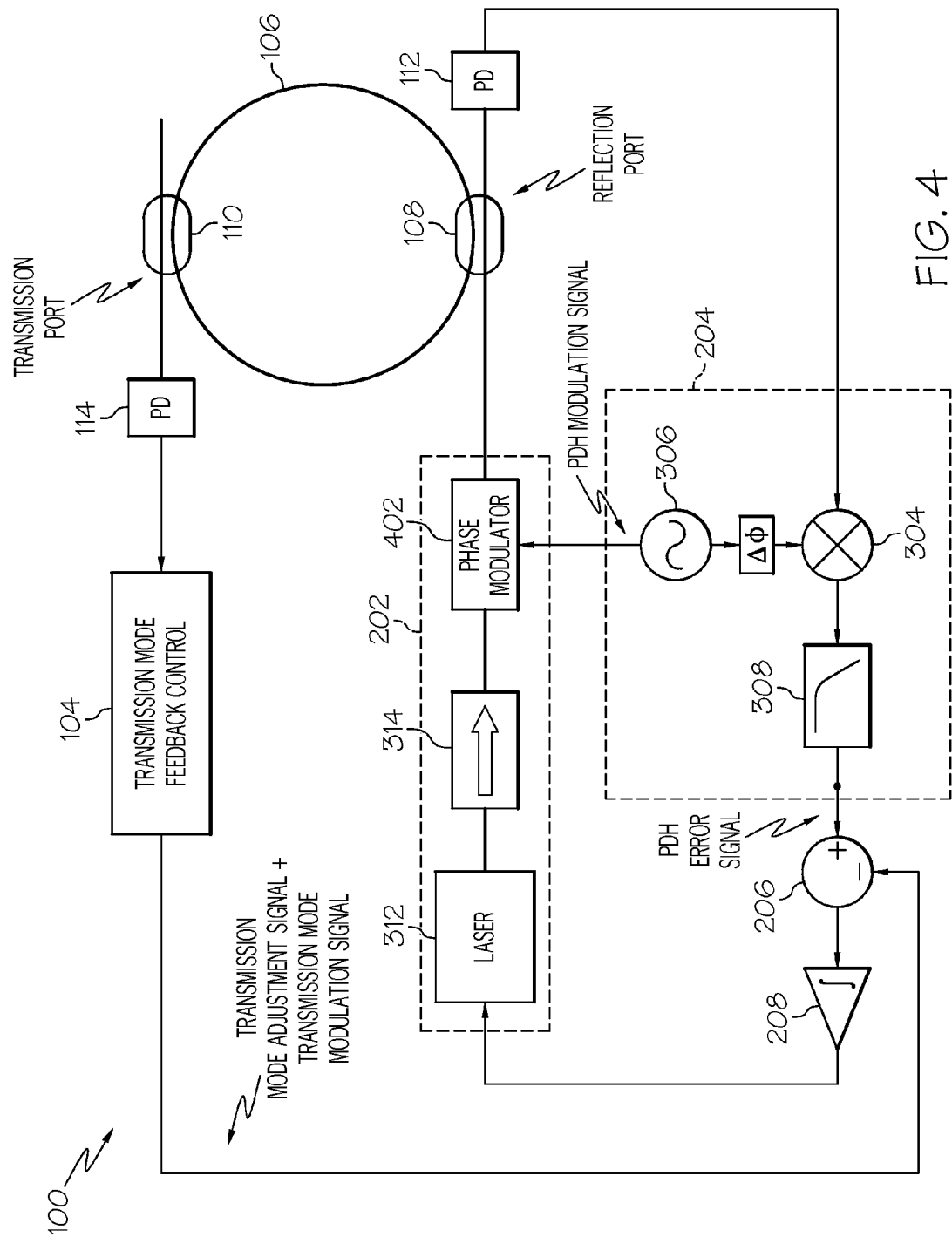
FIG. 4 is a block diagram of another example of the laser assembly and PDH feedback control of FIG. 2.

FIG. 4 is a block diagram of another example of the laser assembly 202 and PDH FCEs 204 of system 100. In this example, the PDH FCEs 204 demodulate and send the PDH error signal similar to that described with respect to FIG. 3. Here, however, the PDH FCEs 204 modulate the light from the laser assembly 202 by applying the PDH modulation signal to a phase modulator 402. The phase modulator 402 is coupled between the laser 312 and the resonator 106 and configured to modulate the phase of the light from the laser 312. In an example, the phase modulator 402 is a lithium niobate phase modulator.

Figure 5:
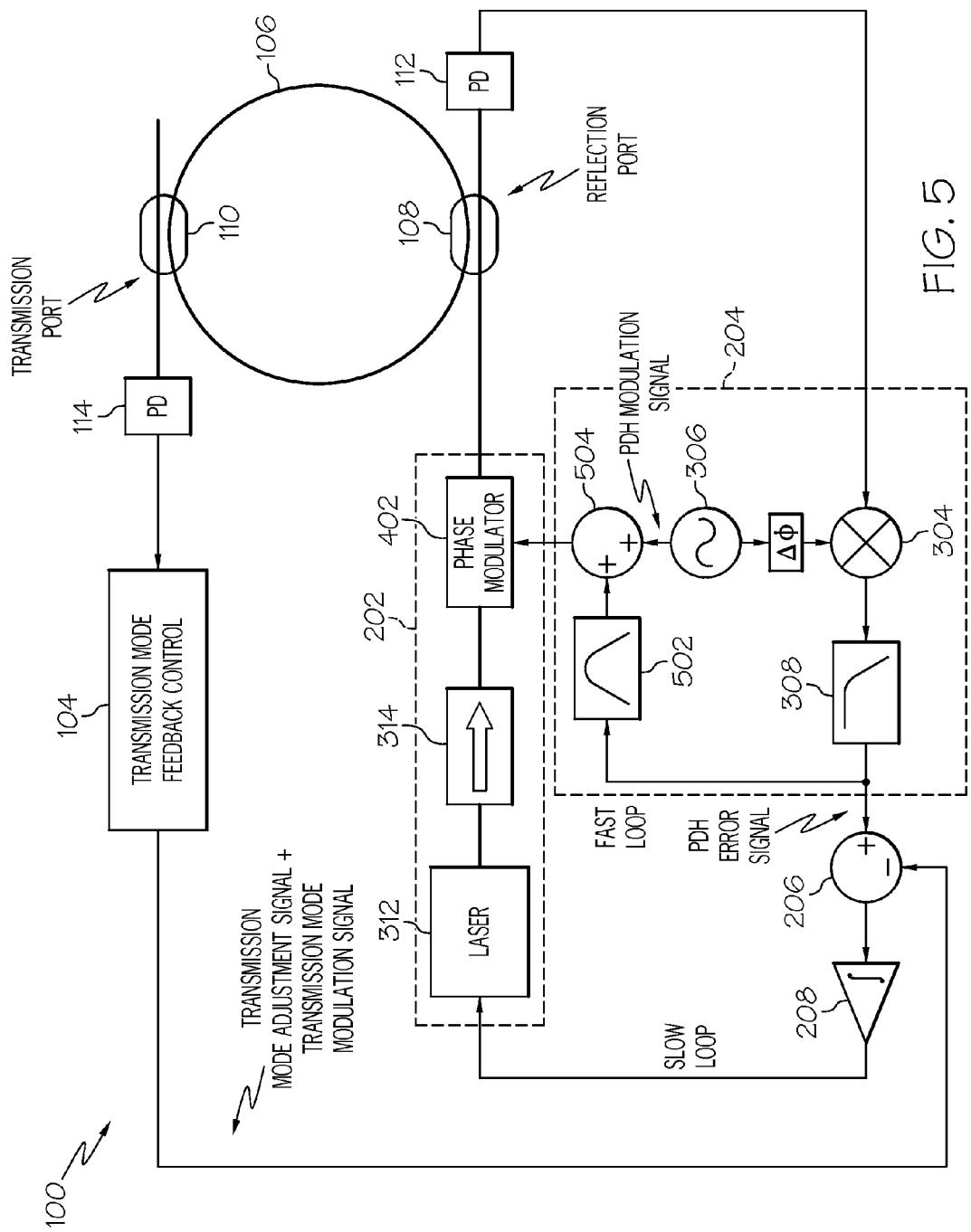
FIG. 5 is a block diagram of yet another example of the laser assembly and PDH feedback control of FIG. 2.

FIG. 5 is a block diagram of yet another example of the laser assembly 202 and PDH FCEs 204 of system 100. In this example, the PDH FCEs 204 modulate the light from the laser assembly 202 similar to that shown in FIG. 4. Here, however, the PDH FCEs 204 adjusts the frequency of the light from the laser assembly 202 in two places. A fast loop adjusts the PHD modulation signal applied to the phase modulator 402 and a slow loop adjusts the laser 312 similar to that described with respect to FIGS. 3 and 4. The fast loop can be used when PDH feedback control has a bandwidth that is higher (faster) than the tuning ability of the laser 312. To account for this, the phase modulator 402 applies higher bandwidth adjustments provided by the fast loop. The fast loop comprises the PDH error signal sent through a bandpass filter 502 and then summed in summer 504 with the PDH modulation signal. This provides a short term average shift to the PDH modulation signal which is then applied to the phase modulator 402 to cancel out short term jitter in the laser frequency. The PDH error signal is also sent to the subtractor 206 on the slow loop to be differenced with the transmission mode adjustment signal as described above with respect to FIGS. 2-4.

Figure 6:
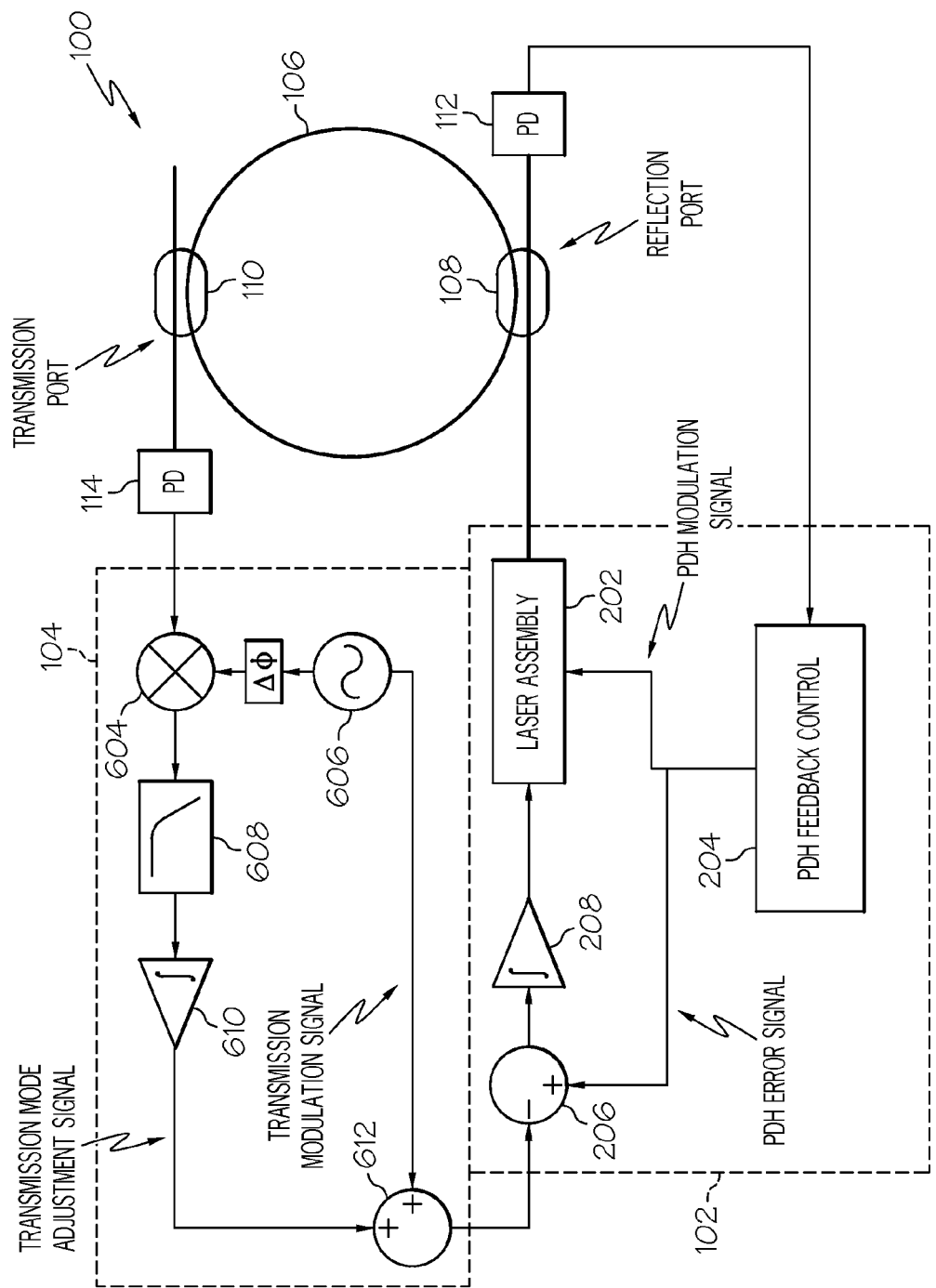
FIG. 6 is a block diagram of an example of the transmission mode feedback control of FIG. 2.

FIG. 6 is a block diagram of an example of the transmission mode FCEs 104 of system 100. The transmission mode FCEs 104 include a mixer 604 configured to demodulate the electrical signal from the photo-detector 114 by mixing the electrical signal with a phase shifted version of the transmission mode modulation signal from the signal generator 606. The resulting signal from the mixer 604 is filtered by a low pass filter 608 to create a transmission mode adjustment signal which is integrated by an integrator 610 before being summed with the transmission mode modulation signal at summer 612. The combined transmission mode adjustment signal and modulation signal are sent to subtractor 206 and are differenced with the PDH error signal before being applied to the laser assembly 202 for adjustment thereof. In this example, the mixer 604, signal generator 606, low pass filter 608, integrator 610 and summer 612 are analog components.

Figure 7:
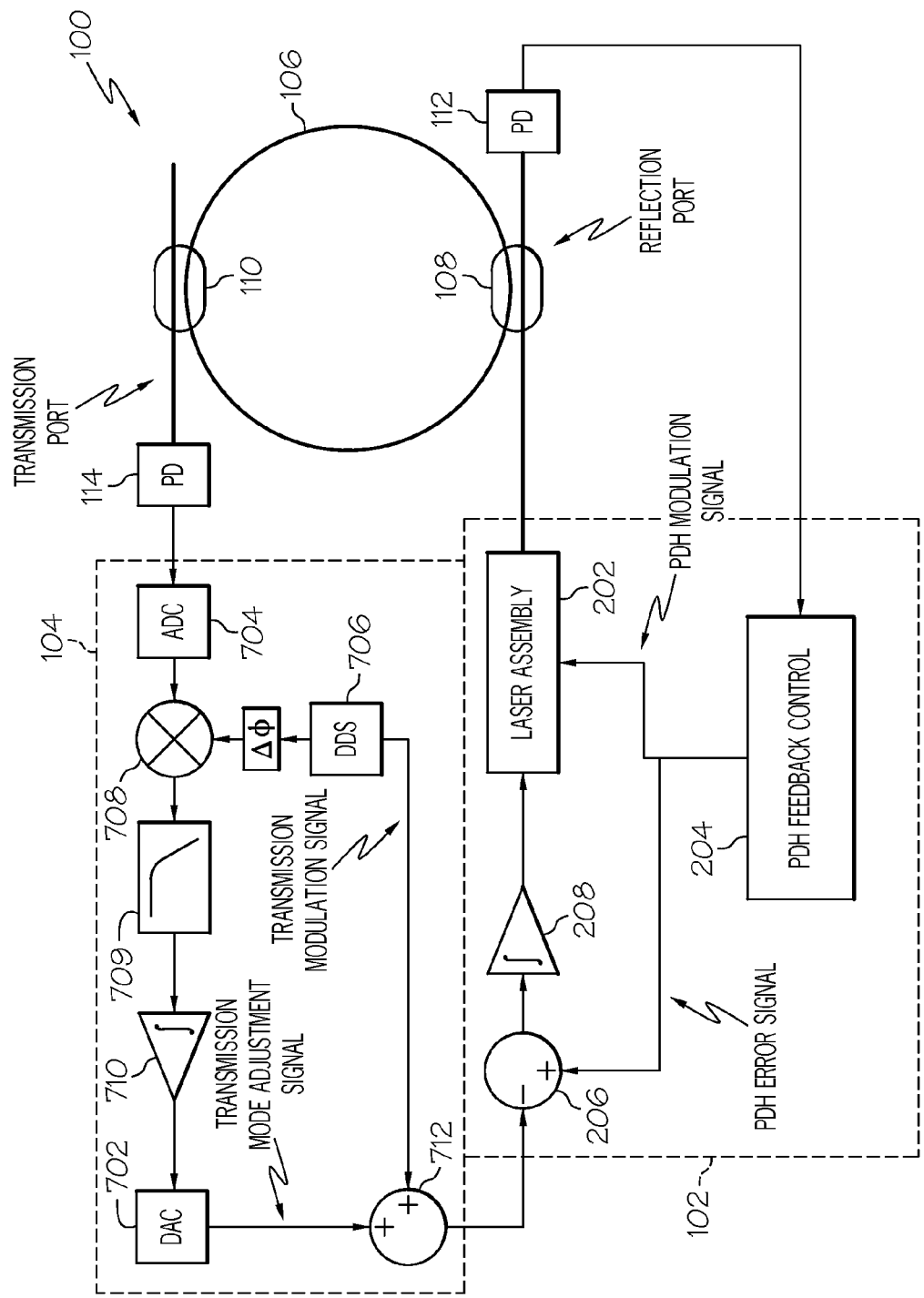
FIG. 7 is a block diagram of another example of the transmission mode feedback control of FIG. 2.

FIG. 7 is a block diagram of another example of the transmission mode FCEs 104 of system 100. In this example, the transmission mode FCEs 104 digitally process the electrical signal from the photo-detector 114 and digitally generate the transmission mode adjustment signal and modulation signal for summing with the PDH error signal at the subtractor 206. The transmission mode FCEs can include one or more processing devices coupled to one or more memory devices having instructions thereon for causing the one or more processing devices to implement the transmission mode feedback control. The one or more processing devices can include a digital signal processor, FPGA or other processing device. An analog to digital converter (ADC) can convert the electrical signal from the photo-detector 114 to a digital signal. The one or more processing devices can then digitally perform the functions of a signal generator 706, mixer 708, filter 709, and integrator 710. The one or more processing devices can perform the functions such that the signal generator 706, mixer 708, filter 709, and integrator 710 perform functions that are substantially the same as the signal generator 606, mixer 604, filter 608, and integrator 610 described with respect to FIG. 6. The signal generator 706 can be a direct digital synthesizer (DDS). The filter 709 can be a low pass filter and can be done with a digital accumulator that averages the output of mixer 708 over a specific period of time and modulation cycles.

The resulting adjustment signal from the integrator 710 is be provided to a digital-to-analog converter (DAC) 702 which generates an analog transmission mode adjustment signal to send to the summer 712. The summer 712 combines the transmission mode adjustment signal with the transmission mode modulation signal from the signal generator 706. The combined signal is sent to subtractor 206. Since some examples of the transmission mode feedback control operate at a slower speed, the transmission mode feedback control can be implemented digitally as described above which can improve accuracy of the transmission mode adjustment signal. Additionally, the combination of the PDH feedback control with the transmission mode feedback control can further relax any speed requirement on the transmission mode feedback control since the PDH feedback control can be used to adjust for the high frequency errors. This relaxation in requirements can further enable the transmission mode feedback control to be implemented digitally.

Figure 8:
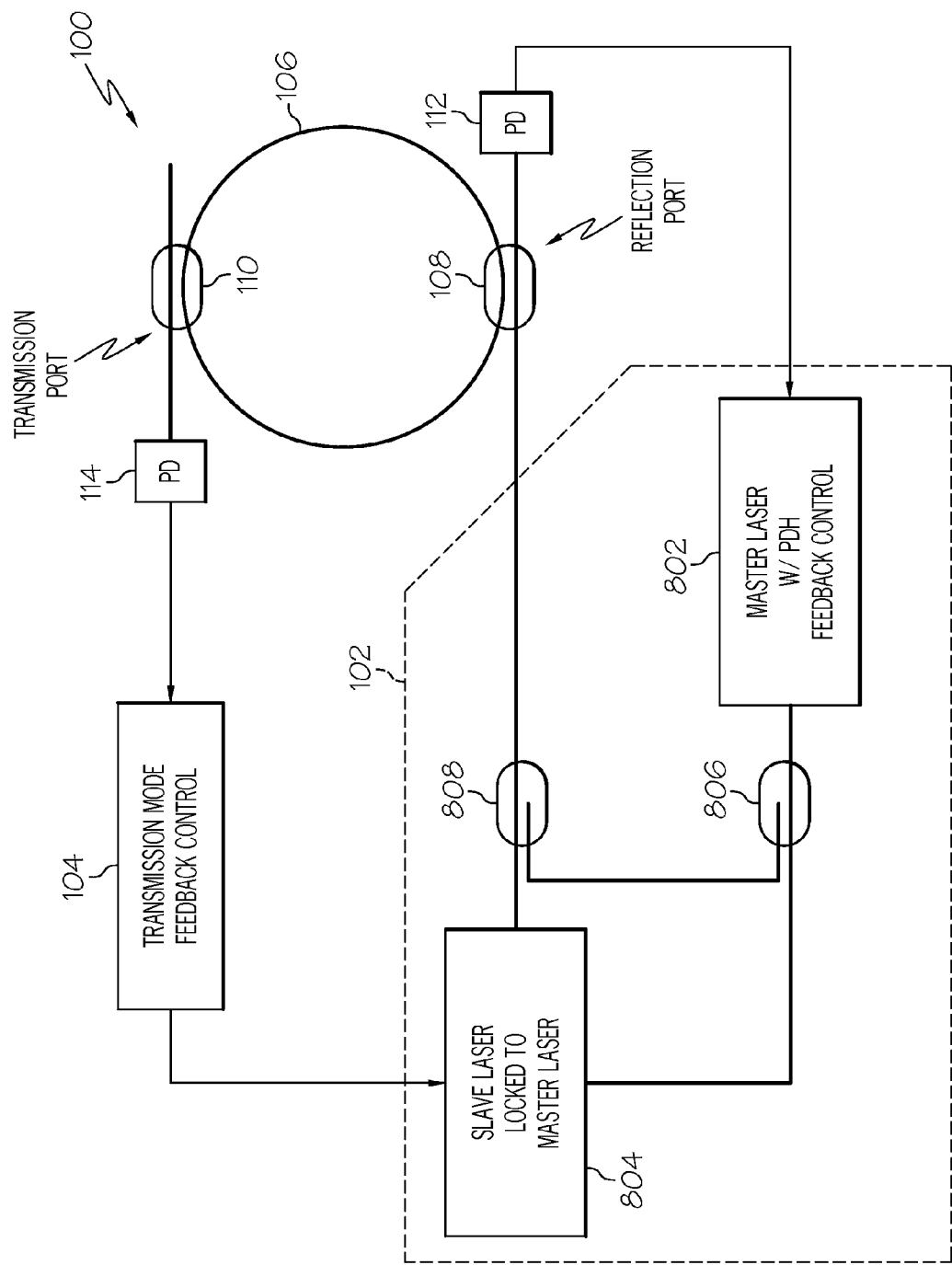
FIG. 8 is a block diagram of another example of the laser with PDH feedback control and transmission mode feedback control of FIG. 1.

FIG. 8 is a block diagram of another example of the laser 102 with PDH feedback control and transmission mode feedback control of system 100. In this example, the laser 102 with PDH feedback control is implemented as a master laser 802 with PDH feedback control and a slave laser 804 that is locked to the master laser 802. Locking the slave laser 804 to the master laser 802 provides the slave laser 804 with the frequency noise reduction of the PDH feedback control. Using this master-slave set-up enables the slave laser 804 to be frequency modulated by the transmission mode modulation signal without modulation of the PDH error signal.

Modulating the PDH error signal as described with respect to FIGS. 2-7 can cause modulation distortion if the transmission mode modulation signal is large compared to the linewidth of the resonator 106. Using the master-slave set-up as shown in FIG. 8 can reduce this distortion by separating the PDH error signal and the transmission mode modulation signal. The PDH error signal controls the master laser 802 and the transmission mode modulation signal modulates the slave laser 804.

The master laser 802 is locked to resonance of the resonator 106 at the reflection port using PDH feedback control. The slave laser 804 is locked to the master laser 802 with an optical phase lock loop (PLL). The PLL provides the slave laser 804 with the low frequency noise qualities of the PDH controlled master laser 802. Light from the master laser 802 is coupled via coupler 806 to the slave laser 804 for locking thereto. The slave laser 804 is set such that (notwithstanding the transmission mode adjustment signal discussed below) there is a constant frequency difference, f-diff, between the master laser 802 and the slave laser 804. F-diff is constant because f-diff does not vary based on changes in the master laser 802, slave laser 804, or resonator 106 during operation. F-diff is set before or during initial operation of the system 100 based on the resonance modes of the resonator 106. In particular, with the master laser 802 set to a given resonance mode of the resonator 106, f-diff is set such that the slave laser 804 is at a different resonance mode of the resonator 106 (e.g., one resonance mode apart).

The frequency difference, f-diff, is set by a frequency difference signal from the transmission mode FCEs 104 to the slaver laser 804. F-diff is determined by a very stable frequency source in the transmission mode FCEs 104, such as a DDS. Accordingly, the master laser 802 outputs light about a first frequency and the slave laser 804 outputs light about a second frequency separated from the first frequency by f-diff. The frequencies of both the master laser 802 and slave laser 804 are modulated and vary accordingly. Thus, the first and second frequencies are the average frequencies of the master laser 802 and slave laser 804. In an example, the first (average) frequency of the master laser 802 is set at a first resonance mode of the resonator 106 and the second (average) frequency of the slave laser 804 is set at a second resonance mode of the resonator 106. Another coupler 808 couples the light from the master laser 802 with the light from the slave laser 804 and both are sent to the first coupler 108 of the resonator 106 for circulation therethrough.

Similar to examples described in FIGS. 2-7, the transmission mode FCEs 104 also provide a transmission mode adjustment signal (delta-f) to adjust the (average) frequency of the light from the slave laser 804. Similar to the examples described in FIGS. 2-7, the transmission mode adjustment signal comprises an adjustment to the frequency of the slave laser 804 based on a resonance tracking error signal at the transmission port. In particular, the adjustment (delta-f) from the transmission mode FCEs 104 lock the slave laser 804 onto resonance at the transmission port. Accordingly, the adjustment (delta-f) varies over time based on variations in the slave laser 804 and resonator 106.

The transmission mode FCEs 104 also provide a transmission mode modulation signal to the slave laser 804 similar to the transmission mode modulation signal discussed above with respect to FIGS. 2-7. Thus, the transmission mode FCEs 104 provide a composite signal to the slave laser 804 including the frequency difference, f-diff, between the slave laser 804 and the master laser 802, the transmission mode modulation signal, and the transmission mode adjustment signal (delta-f). The composite signal from the transmission mode FCEs 104 causes the slave laser 804 to be set to an average frequency equal to f-diff plus delta-f from the master laser 802 with that average frequency being modulated by the transmission mode modulation signal. The transmission mode adjustment signal can keep the slave laser 804 on resonance by adjusting delta-f. The combination of locking the slave laser 804 to a master laser 802 with PDH feedback control and locking the frequency of the slave laser 804 with transmission mode feedback control to the transmission port provides the slave laser 804 with both low frequency noise within the bandwidth of the PDH feedback control and low frequency drift. The light from the slave laser 804 can then be used for accurate rotation measurements.

Figure 9:
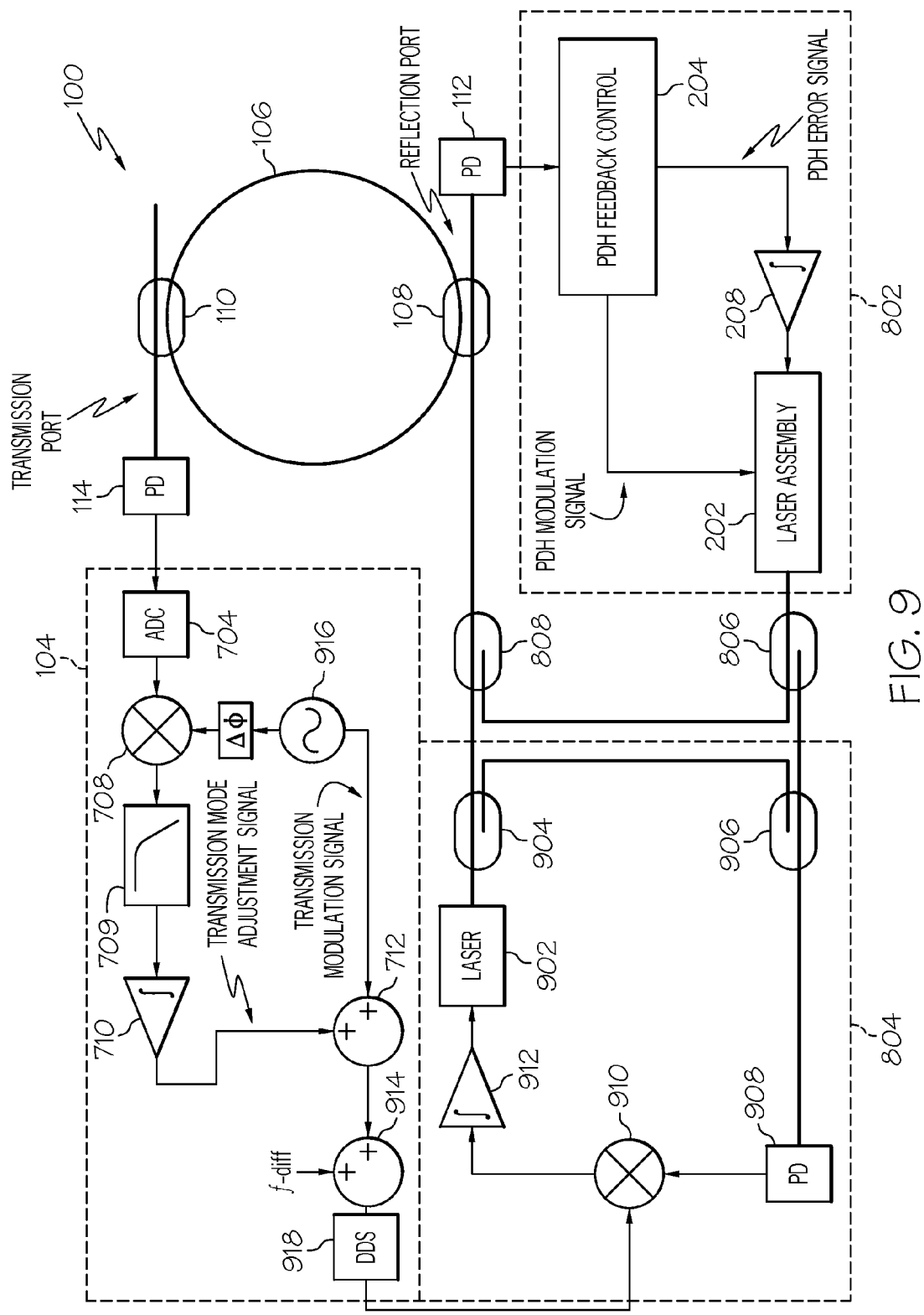
FIG. 9 is a block diagram of an example of the master laser with PDH feedback control, the slave laser locked to the master laser, and the transmission mode feedback control of FIG. 8.

FIG. 9 is a block diagram of an example of the master laser 802 with PDH feedback control, the slave laser 804 and PLL, and the transmission mode feedback control 104 shown in FIG. 8. The master laser 802 with PDH feedback control includes a laser assembly 202 configured to generate light for circulation within the resonator 106. The master laser 802 with PDH feedback control also includes PDH FCEs 204 for locking the frequency of the light from the laser assembly 202 to resonance at the reflection port of the resonator 106. The PDH FCEs 204 and laser assembly 202 function as described with respect to FIG. 2. In this example, however, the transmission mode modulation signal and transmission mode adjustment signal are not summed with the PDH error signal. Instead the PDH error signal controls the laser assembly 202 without adjustment from the transmission mode FCEs 104. This locks the laser assembly 202 to resonance of the resonator 106 at the reflection port. Any of the example laser assemblies 202 and PDH FCEs 204 described in FIGS. 3-5 can be used.

As described with respect to FIG. 8, the light from the laser assembly 202 is coupled via the coupler 806 to the slave laser 804 for locking thereto. The slave laser 804 includes a laser 902 in an optical PLL. In an example, the laser 902 is a semiconductor laser. The PLL of the slave laser 804 includes a coupler 904 to couple the light from the laser 902 into the PLL and another coupler 906 to couple the light from the laser 902 with the light from the master laser 802. This combination is sent to a photo-detector 908 which generates an electrical signal based on the light. The electrical signal is mixed with the signal from the transmission mode FCEs 104 at mixer 910 and then integrated by integrator 912 with phase lag compensation before controlling the laser 902. The resulting signal from the laser 902 is coupled with the signal from the laser assembly 202 and sent to resonator 106.

As mentioned above, the signal from the transmission mode FCEs 104 includes the transmission mode modulation signal, the transmission mode adjustment signal (delta-f), and a constant frequency difference (f-diff). The transmission mode modulation signal and the transmission mode adjustment signal are digitally generated. The ADC 704, mixer 708, filter 709, integrator 710, and summer 712 are functions substantially as described with respect to FIG. 7. The transmission mode modulation signal is generated as a digital representation of a sine wave at 912. As mentioned with respect to FIG. 7, the mixer 708, filter 709, integrator 710, summer 712, and digital representation of a sine wave 916 are functions performed by one or more digital processing devices. The combined transmission mode modulation signal and transmission mode adjustment signal are sent from summer 712 to summer 914 where they are combined with a fixed value that represents the constant frequency difference, f-diff. As discussed above this frequency difference, f-diff, is the nominal offset between the frequencies of the slave laser 804 and the master laser 802. F-diff and summer 914 are also digital functions performed by one or more processing devices as discussed with respect to FIG. 7. The output of summer 914 is sent to sine wave generator 918, which is typically a DDS. The output of sine wave generator 918 is a sine wave having a frequency that is proportional to the combined signals from summer 914.

The resulting composite signal from the transmission mode FCEs 104 is mixed with the signal in the PLL of the slave laser 804 at mixer 910. Mixing in the transmission mode modulation signal at mixer 910 modulates of the laser 902 and mixing in the transmission mode adjustment signal locks the laser 902 to the resonance at the transmission port. Mixing in the frequency difference, f-diff, at mixer 910 sets the laser 902 such that there is a constant frequency difference between the laser 902 and the laser assembly 202 equal to f-diff. Combining the light from the laser 902 and the laser assembly 202 in coupler 906 produces a beat frequency. When the beat frequency is equal to f-diff this control does not change the laser 902 resulting in the slave laser 804 being locked to the master laser 802 with a constant frequency difference therebetween equal to f-diff. This locking with an appropriate choice of f-diff enables the slave laser 804 to be on a different resonance mode than the master laser 802 and to have the low frequency noise of the master laser 804 with PDH feedback control.

Figure 10:
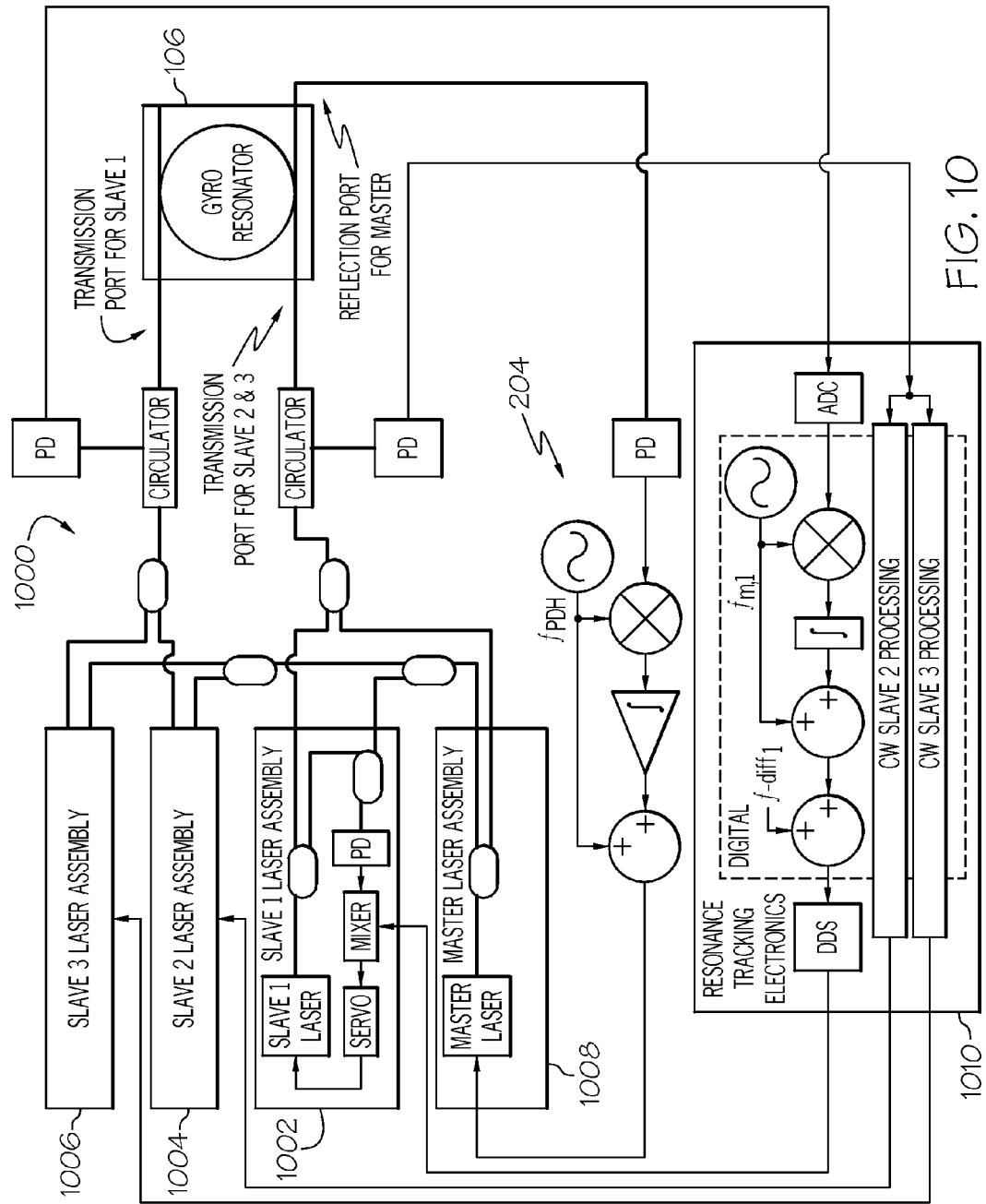
FIG. 10 is a block diagram of an example of a resonator fiber optic gyroscope (RFOG) including lasers with transmission and reflection mode feedback control.

FIG. 10 is a block diagram of an example of a resonator fiber optic gyroscope (RFOG) 1000 including resonance tracking lasers with transmission and reflection mode feedback control as described with respect to FIGS. 8 and 9. Using resonance tracking lasers with transmission and reflection mode feedback control enables the resonance tracking lasers 1002, 1004, 1006 to be locked onto the gyroscope resonator 106 to reduce relative noise between the lasers 1002, 1004, 1006 and the resonator 106. This can improve gyroscope performance with laser having phase noise and in vibration environments. The example of FIG. 10 also uses information from the transmission port to correct bias errors of the PDH loop.

The resonance tracking lasers 1002, 1004, 1006 used for rotation sensing in the RFOG 1000 achieve transmission and reflection mode feedback control using a master-slave set-up similar to that described with respect to FIGS. 8 and 9, where the resonance tracking lasers are slave lasers to a master laser 1008. Instead of a single slave laser as described with respect to FIGS. 8 and 9, however, multiple slave lasers are used; at least a first slave laser to circulate in a first direction through the gyroscope resonator 106 and a second slave laser to counter-propagate with the first slave laser in a second direction through the resonator 106. The example shown in FIG. 10 has three slave lasers including a first slave laser assembly 1002, a second slave laser assembly 1004, and a third slave laser assembly 1006 (also referred to herein as simply first, second, and third "lasers"). Light from the first slave laser assembly 1002 is coupled into the resonator 106 to propagate in a first direction and light from the second and third slave laser assemblies 1004, 1006 is coupled into the resonator 106 to counter-propagate with the light from the first slave laser assembly 1002 in a second direction through the resonator 106. In an example, the first, second, and third slave lasers 1002, 1004, 1006 include similar components. FIG. 10 illustrates the components of the first slave laser 1002; the second and third slave lasers 1004, 1006 can include similar components.

Each of the slave lasers 1002, 1004, 1006 is stabilized with transmission and reflection mode feedback from the gyroscope resonator 106. That is, each of the slave lasers 1002, 1004, 1006 is controlled based on feedback from the resonator 106 that is used for rotation sensing. By using the same resonator 106 for rotation sensing and for transmission and reflection mode feedback, as opposed to using a reference resonator, the relative frequency noise between the lasers 1002, 1004, 1006 and the gyroscope resonator 106 is reduced which can improve performance of the RFOG 1000.

The reflection mode feedback to reduce frequency noise of the slave lasers 1002, 1004, 1006 is achieved by locking each of the slave lasers 1002, 1004, and 1006 to a master laser 1008 with PDH feedback control. The master laser 1008 with PDH feedback control can be achieved as described with respect to the master laser 802 with PDH feedback control of FIGS. 8 and 9. Accordingly, the master laser 1008 can be locked to resonance of the resonator 106 at the reflection port. As described with respect to FIG. 9, the PDH feedback control to lock the master laser 1008 to the reflection port can be achieved using any of the example PDH FCEs 204 described in FIGS. 3-5. FIG. 10 illustrates an example using the PDH FCEs 204 described in FIG. 3. Accordingly, the PDH FCEs 204 are configured to adjust the master laser 1008 to lock the master laser 1008 to the reflection port resonance and to control the master laser 1008 to achieve the PDH modulation of the reference light from the master laser 1008. The reference light from the master laser 1008 is coupled to circulate in the same direction through the resonator 106 as the first slave light from the first slave laser 1002.

The reference light is also sent to each of the slave lasers 1002, 1004, 1006 for locking thereto. Each of the slave lasers 1002, 1004, 1006 is locked to the master laser 1008 such that there is a constant frequency difference, f-diff, between the master laser 1008 and each slave laser 1002, 1004, 1006. Each slave laser 1002, 1004, 1006 has a different constant frequency difference, f-diff1, f-diff2, and f-diff3, from the master laser 1008 and, as such, produces light at a frequency that is distinct from the other slave lasers 1002, 1004, 1006. More detail regarding the constant frequency difference is provided below. Each of the slave lasers 1002, 1004, 1006 can be locked to a master laser 1008 with an optical PLL as described with respect to FIG. 9. Accordingly, each of the slave lasers 1002, 1004, 1006 can achieve low frequency noise with respect to the resonator 106 based on the PDH technique.

The slave lasers 1002, 1004, 1006 are also controlled to lock onto resonance at respective transmission ports of the resonator 106. The slave lasers 1002, 1004, 1006 are locked onto resonance at their respective transmission ports by the transmission mode FCEs 1010. The transmission mode FCEs 1010 can include components and operate as described with respect to FIG. 9 for each slave laser 1002, 1004, 1006. Accordingly, the transmission mode FCEs 1010 can lock to the first slave laser 1002 to a first transmission port resonance of the resonator 106, can modulate the first slave light according to a first transmission mode modulation signal (fm,1), and can send a first constant frequency difference, f-diff1, to the first slave laser 1002 to set the constant frequency difference between the first slave light and the reference light. Similarly, the transmission mode FCEs 1010 can lock the second slave laser 1004 to a second transmission port resonance of the resonator 106, can modulate the second slave light according to a second transmission mode modulation signal (fm,2), and can send a second constant frequency difference, f-diff2, to the second slave laser 1004 to set the constant frequency difference between the second slave light and the reference light. Finally, the transmission mode FCEs 1010 can lock the third slave laser 1006 to a third transmission port resonance of the resonator 106, can modulate the third slave light according to a third transmission mode modulation signal (fm,3), and can send a third constant frequency difference, f-diff3, to the third slave laser 1006 to set the constant frequency difference between the third slave light and the reference light. In this manner, each of the slave lasers 1002, 1004, 1006 can be controlled by transmission and reflection mode feedback from the resonator 106.

Figure 11:
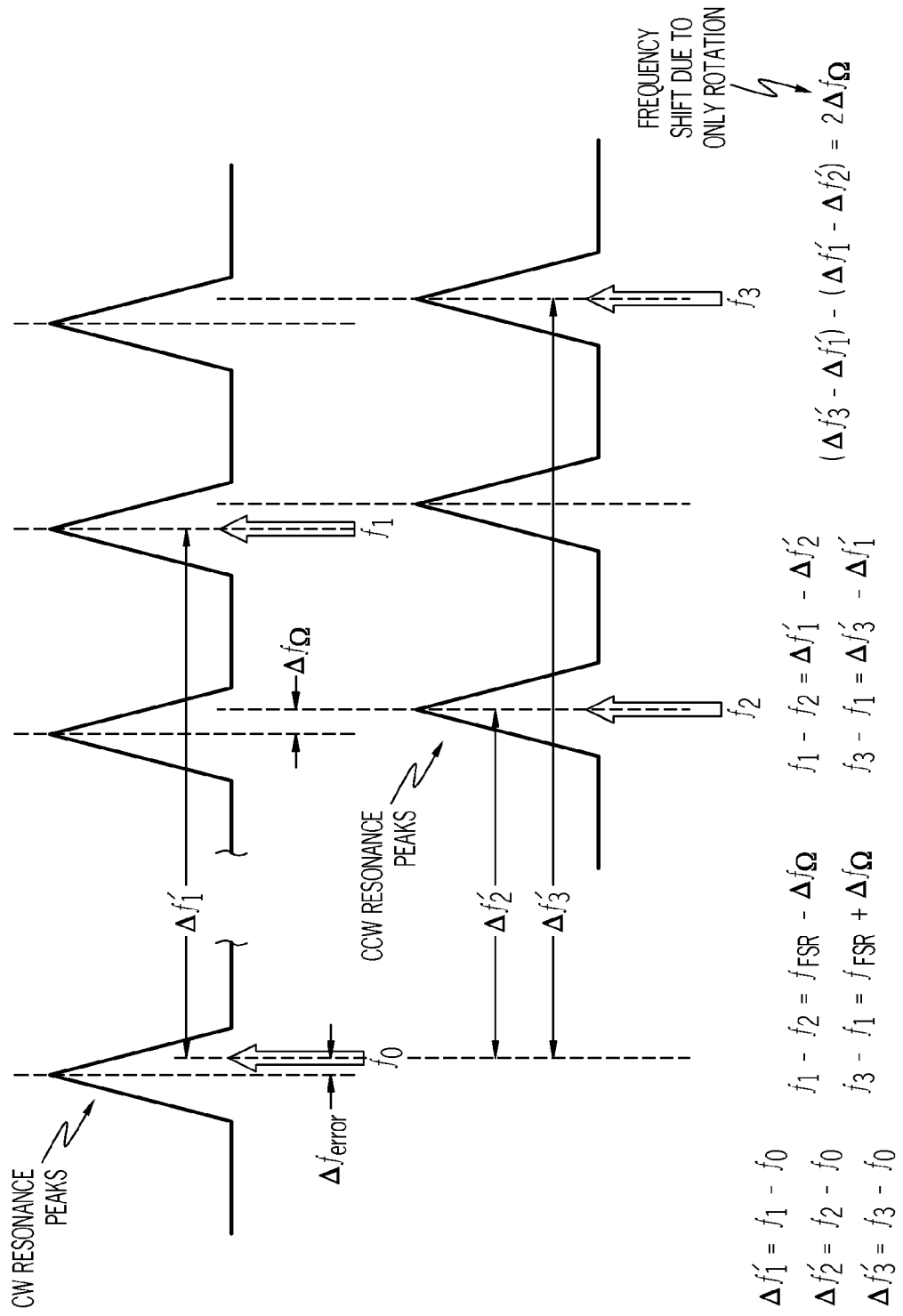
FIG. 11 is a graph of an example clockwise intensity waveform and counter-clockwise intensity waveform in the resonator of FIG. 10.

FIG. 11 is a graph of an example clockwise intensity waveform and counter-clockwise intensity waveform in the gyroscope resonator 106 of FIG. 10. In FIG. 11 delta-f1-prime is f-diff1 plus delta-f1 described herein, delta-f2-prime is f-diff2 plus delta-f2, and delta-f3-prime is f-diff3 plus delta-f3, where delta-f1, delta-f2, and delta-f3 are the same as delta-f described herein, except are unique to each slave laser. Delta-f-omega is the frequency difference due to rotation. The first, second, and third constant frequency differences (f-diff1, f-diff2, f-diff3) can be set independently as described above with respect to FIG. 10. The frequency of the master laser 1008 can also be set such that the beat frequencies between the slave lasers 1002, 1004, 1006 are within normal operating limits of the transmission mode FCEs 1010 while the slave lasers 1002, 1004, 1006 are locked to the resonator 106. The first constant frequency difference, f-diff1, can be configured to tune the first slave laser 1002 to a resonance frequency of the resonator 106 in the first direction. The second constant frequency difference, f-diff2, can be configured to tune the second slave laser 1004 to a resonance frequency of the resonator 106 in the second direction that is one longitudinal mode lower than the resonance frequency of the first slave laser 1002 at zero rotation rate. The third constant frequency difference, f-diff3, can be configured to tune the third slave laser 1006 to another resonance frequency of the resonator 106 in the second direction that is one longitudinal mode higher than the resonance frequency of the first slave laser 1002 at zero rotation rate.

Once the slave lasers 1002, 1004, 1006 are set near the respective resonance modes using their respective constant frequency differences, the transmission mode FCEs 1010 lock each slave lasers onto its respective resonance by providing adjustments (delta-f1, delta-f2, delta-f3) in respective transmission mode adjustment signals based on transmission mode feedback. The composite signal sent to each slave laser 1002, 1004, 1006 sets the frequency difference (delta-f1-prime, delta-f2-prime, delta-f3-prime) between each slave laser 1002, 1004, 1006 and the master laser 1008 to equal the constant frequency difference (f-diff1, f-diff2, f-diff3) for each slave laser 1002, 1004, 1006, plus the adjustment (delta-f1, delta-f2, delta-f3) based on transmission mode feedback for each slave laser 1002, 1004, 1006.

In an example, the reference frequency, $f_0$, of the master laser 1008 is set to be lower than the slave frequencies. In this example, the first, second, and third frequency differences are $\Delta f_1' = f_1 - f_0$, $\Delta f_2' = f_2 - f_0$, and $\Delta f_3' = f_3 - f_0$, where $f_1$, is the frequency of light from the first slave laser 1002, $f_2$, is the frequency of light from the second slave laser 1004, and $f_3$, is the frequency of light from the third slave laser 1008. The resonance tracking data $\Delta f_1'$, $\Delta f_2'$ and $\Delta f_3'$ can be output from the transmission mode FCEs 1010 to a processor that makes the calculation $(\Delta f_3' - \Delta f_1') - (\Delta f_1' - \Delta f_2') = 2\Delta f_\Omega$, where $\Delta f_\Omega$ is proportional to rotation rate, $\Delta f_3' - \Delta f_1' = f_{FSR} + \Delta f_\Omega$, and $\Delta f_1' - \Delta f_2' = f_{FSR} - \Delta f_\Omega$. Thus, a rotation measurement is obtained without dependence on free spectral range (FSR) and any associated bias and bias instability.

In examples using two slave lasers (e.g., examples that don't combine two lights to generate the beam propagating in the second direction), the beam from a first of the two slave lasers is locked onto a resonance dip at a resonance frequency of a first direction through the resonator 106. The beam from a second of the two slave lasers, is locked onto a resonance dip at a resonance frequency which is one longitudinal mode away from the resonance frequency of the first slave laser (e.g., has one less wave cycle that fits within the resonator ring) at zero rotation rate. The frequency spacing between adjacent modes is termed the free spectral range (FSR). Since the free spectral range depends on the optical pathlength, which can depend on temperature due to thermal expansion, the resulting bias may be unstable due to temperature variations. The effects of the free spectral range can be reduced by periodically switching the frequency of the second slave laser from the resonance dip that is one longitudinal mode lower than the resonance mode of the first slave laser to the resonance mode that is one resonance mode higher than the resonance mode of the first slave laser.

Figure 12:
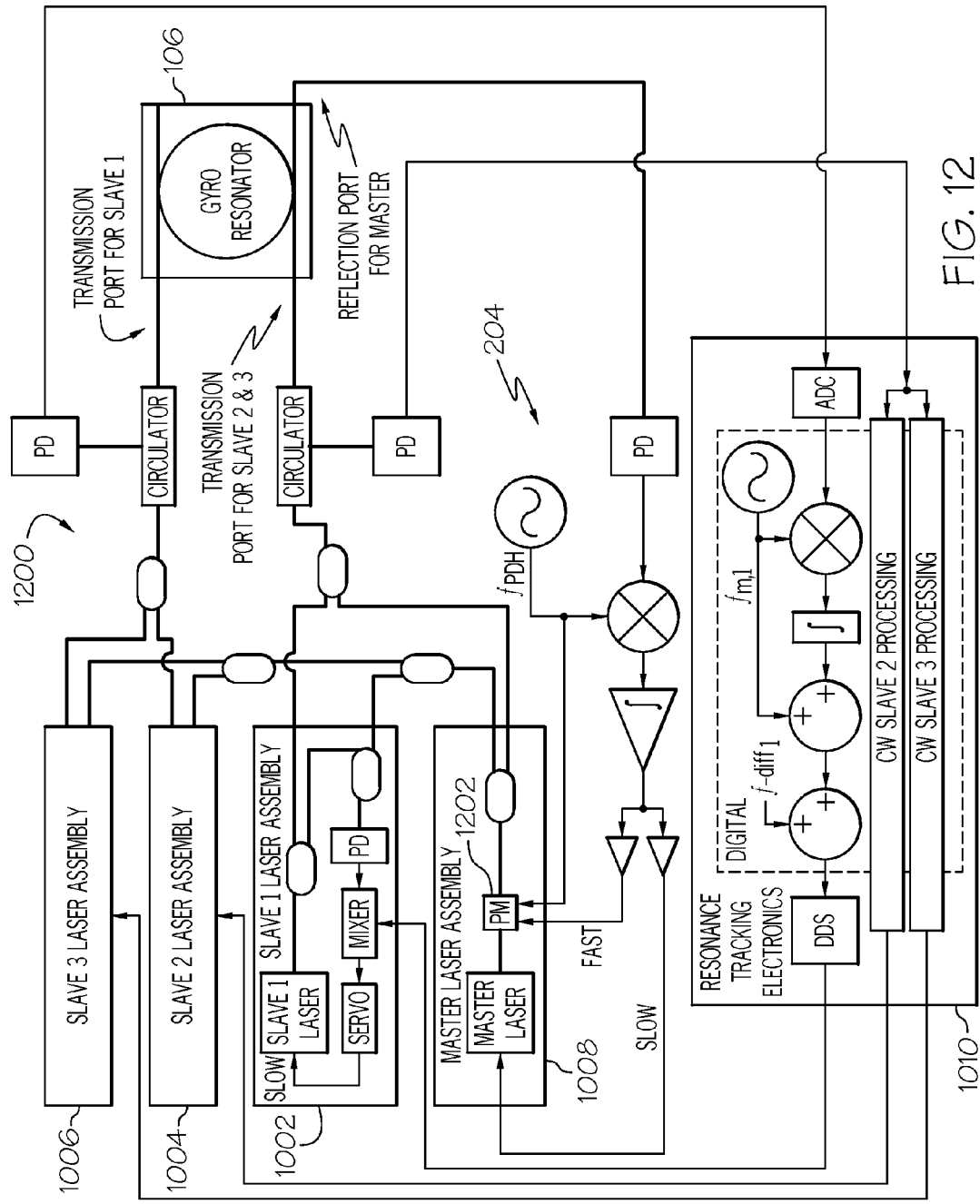
FIG. 12 is a block diagram of another example of an RFOG including lasers with transmission and reflection mode feedback control.

FIG. 12 is a block diagram of another example of an RFOG 1200 including resonance tracking lasers with transmission and reflection mode feedback control as described with respect to system 100. Similar to the RFOG 1000, the RFOG 1200 includes three slave lasers 1002, 1004, 1006 that are locked to a master laser 1008 with PDH feedback control. The slave lasers 1002, 1004, 1006 also have feedback control from their respective transmission ports implemented by a transmission mode FCEs 1010. In RFOG 1200, the PDH feedback control for the master laser 1008 is implemented as described with respect to FIG. 5. For example, a phase modulator 1202 is included to modulate the reference light from the master laser 1008 according to a PDH modulation signal. In addition, the PDH feedback control includes a fast loop to provide a short-term average shift to the PDH modulation signal which is then applied to the phase modulator 1202. The PDH feedback control also includes a slow loop that adjusts the master laser 1008 itself to adjust the frequency thereof.

Figure 13:
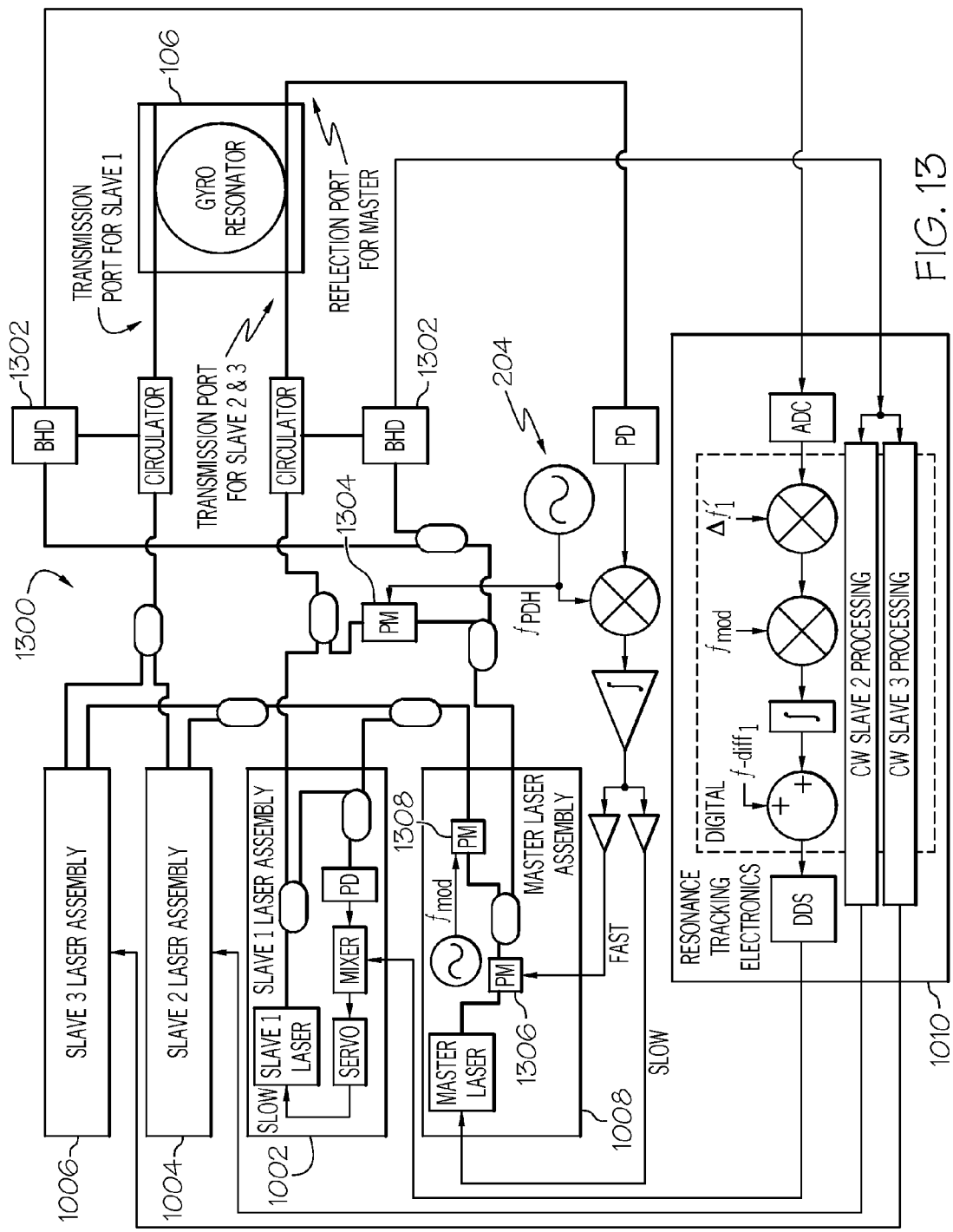
FIG. 13 is a block diagram of yet another example of an RFOG including lasers with transmission and reflection mode feedback control.

FIG. 13 is a block diagram of yet another example of an RFOG 1300 including resonance tracking lasers with transmission and reflection mode feedback control as described with respect to system 100. Similar to RFOG 1200, the RFOG 1300 includes three slave lasers 1002, 1004, 1006 that are locked to a master laser 1008 with PDH feedback control. In other examples, other numbers of slave lasers (e.g., two) can be used as described above.

RFOG 1300 uses a balanced heterodyne detection (BHD) for resonance tracking of the light from the slave lasers 1002, 1004, 1006 in the resonator 106. BHD uses a portion of the reference light from the master laser 1008. PDH modulation of the reference light, however, can cause errors in the BHD. Accordingly, the PDH modulation in RFOG 1300 is applied to a first phase modulator 1304 that is on the portion of the reference light that is sent to the resonator 106, but not on the portion of the reference light that is sent to the BHDs 1302. The fast loop adjust is provided to a second phase modulator 1306 to control the phase of the light that goes to the gyro resonator 106, the reference light to the BHDs 1302, and the reference light that is provided to the slave lasers 1002, 1004, 1006.

The RFOG 1300 also performs common transmission mode modulation of the slave lasers 1002, 1004, 1006 with fmod in order to reduce rate sensing errors associated with modulation imperfections. Accordingly, the transmission mode modulation signal is applied by a third phase modulator 1308 instead of by the transmission mode FCEs 1010.

The third phase modulator 1308 is configured to modulate the portion of the reference light that is provided to the slave lasers 1002, 1004, 1006, but not the portion of the reference light that is provided to the BHDs 1302 or the portion of the reference light that is provided to the resonator 106. The transmission mode modulation signal is sent to the third phase modulator 1308 and the third phase modulator 13078 modulates this portion of the reference light accordingly.

The transmission mode FCEs 1010 of RFOG 1300 receive a signal from the corresponding BHD 1302 and convert the signal to digital with an ADC. The analog signal then has a corresponding transmission mode adjustment signal, delta-f1-prime, delta-f2-prime, delta-f3-prime, mixed with it. The resulting signal is demodulated with the transmission mode modulation signal before being integrated and summed with the appropriate constant frequency difference, f-diff1, f-diff2, f-diff3. A DDS then generates an analog signal for sending to each slave laser assembly 1002, 1004, 1006.

Although RFOG 1300 illustrates an example using the PDH feedback control described in FIG. 5, in other examples, the PDH feedback controls described with respect to FIGS. 3 and 4 could be used. For example, an RFOG 1300 using BHD and the PDH feedback control described with respect to FIG. 3 would not include the first phase modulator 1304 and the second phase modulator 1306 would receive input from the transmission mode modulation signal only.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A stabilized laser comprising:
    a laser to produce light at a frequency;
    a resonator coupled to the laser such that the light from the laser circulates therethrough;
    Pound-Drever-Hall (PDH) feedback electronics configured to adjust the frequency of the light from the laser to reduce phase noise in response to light sensed at a reflection port of the resonator;
    transmission port feedback electronics configured to adjust the frequency of the light from the laser toward resonance of the resonator at a transmission port in response to the light sensed at the transmission port of the resonator, wherein the transmission port feedback electronics adjust the frequency at a rate at least ten times slower than the PDH feedback electronics;
    a master laser coupled to the PDH feedback electronics and to the resonator, the master laser to produce a reference light to propagate through the resonator, wherein the PDH feedback electronics are configured to reduce phase noise in the reference light by adjusting a frequency of the master laser toward resonance at the reflection port, wherein the laser comprises a first slave laser to produce a first slave light; and
    a first phase-lock-loop (PLL) coupled to the transmission mode feedback electronics, the first PLL to beat the first slave light with the reference light and to generate a first PLL adjustment signal to drive the first slave laser toward a lock with the reference light.

2. The stabilized laser of claim 1, wherein the light from the laser is modulated with a PDH modulation signal at a first frequency and transmission mode modulation signal at a second frequency, wherein the first frequency is within the range of 1-100 MHz and wherein the second frequency is within the range of 1-100 KHz.

3. The stabilized laser of claim 1, wherein the transmission mode feedback electronics are configured to generate a first frequency difference signal to modify the first PLL adjustment signal to drive the first slave laser toward a second resonance mode of the resonator, the second resonance mode different than a first resonance mode toward which the reference light is driven by the PDH feedback electronics; wherein the first PLL is configured to combine the first frequency difference signal with the first PLL adjustment signal to generate a combined signal and to provide the combined signal to a set-point of the first slave laser.

4. The stabilized laser of claim 1, wherein the PDH feedback electronics are configured to adjust a frequency of the master laser by adjusting an average frequency of the master laser toward resonance at the reflection port, wherein the transmission mode feedback electronics are configured to adjust a frequency of the first slave laser by adjusting an average frequency of the first slave laser toward the second resonance mode.

5. The stabilized laser of claim 1, wherein the PDH feedback electronics are configured to adjust a frequency of the master laser by adjusting a set-point of the master laser.

6. The stabilized laser of claim 1, wherein the transmission mode feedback electronics are configured to adjust a frequency of the slave laser by adjusting a set-point of the slave laser.

7. A method of stabilizing a laser, the method comprising:
    generating light with a master laser;
    frequency modulating the light from the master laser with a Pound-Drever-Hall (PDH) modulation signal;
    generating light with a slave laser;
    frequency modulating the light from the slave laser with a transmission mode modulation signal;
    locking the slave laser to the master laser;
    coupling the light from the master laser and the light from the slave laser to a first port of a resonator;
    sensing light at a reflection port of the resonator;
    demodulating the light at the reflection port based on the PDH modulation signal;
    adjusting a frequency of the master laser in response to the light at the reflection port using a PDH technique;
    demodulating the light at the transmission port based on the transmission mode modulation signal; and
    adjusting the frequency of the slave laser toward resonance of the resonator at the transmission port in response to the light at the transmission port.

8. The method of claim 7, wherein adjusting a frequency of the slave laser toward resonance of the resonator at the transmission port is at a rate at least ten times slower than adjusting the frequency of the master laser in response to the light at the reflection port.

9. The method of claim 8, wherein the PDH modulation signal is in the frequency range of 1-100 MHz, and the transmission mode modulation signal is in the frequency range of 1-100 KHz.

10. The method of claim 7, wherein adjusting a frequency of the master laser includes adjusting a frequency of the master laser toward resonance of the resonator at the reflection port.

11. The method of claim 10, wherein locking the slave laser to the master laser includes:
    beating the light from the slave laser with the light from the master laser in a first phase-lock-loop (PLL); and generating a PLL adjustment signal to drive the light from the slave laser toward a lock with the reference light.

12. The method of claim 11, wherein locking the light from the slave laser to the light from the master laser includes modifying the PLL adjustment signal to drive the first slave laser toward a different resonance mode of the resonator than a resonance mode toward which the light from the master laser is driven.

13. The method of claim 12, wherein adjusting a frequency of the master laser includes adjusting an average frequency of the master laser toward resonance at the reflection port,
   wherein adjusting a frequency of the slave laser includes adjusting an average frequency of the slave laser toward the different resonance mode.

14. The method of claim 7, wherein adjust a frequency of the master laser includes adjusting a set-point of the master laser.

15. The method of claim 7, wherein adjusting a frequency of the slave laser includes adjusting a set-point of the slave laser.

* * * * *